United States Patent

Nakamura et al.

Patent Number: 5,169,875
Date of Patent: Dec. 8, 1992

[54] URETHANE COMPOSITION

[75] Inventors: Tsutomu Nakamura; Tetsuo Sasaki; Kunio Fushimi; Yoshiyuki Miyazaki, all of Yokohama, Japan

[73] Assignee: Hodogaya Chemical Co., Ltd., Tokyo, Japan

[21] Appl. No.: 429,399

[22] Filed: Oct. 31, 1989

[30] Foreign Application Priority Data

Nov. 2, 1988 [JP] Japan ............... 63-276142

[51] Int. Cl.$^5$ ............................... C08G 65/42
[52] U.S. Cl. .................... 521/155; 521/163; 521/170; 521/174; 521/177; 521/180; 521/906
[58] Field of Search ............ 521/136, 174, 906, 155, 521/163, 170, 177, 180

[56] References Cited

U.S. PATENT DOCUMENTS

| | | | |
|---|---|---|---|
| 4,136,240 | 1/1979 | Zimmerman et al. | 521/115 |
| 4,186,255 | 1/1980 | Klein et al. | 521/128 |
| 4,390,641 | 6/1983 | Smith | 521/136 |
| 4,448,951 | 5/1984 | Rupert et al. | 521/129 |
| 4,490,490 | 5/1983 | Patton, Jr. et al. | 521/177 |
| 4,555,530 | 11/1985 | Patton, Jr. et al. | 521/136 |

FOREIGN PATENT DOCUMENTS 2033413  5/1980  United Kingdom.

OTHER PUBLICATIONS

Patent Abstracts of Japan, vol. 12, No. 501, (C-556)[3348], Dec. 27, 1988; & JP-A-63 213 512 (Hodogaya Chem. Co.) Sep. 6, 1988.

Primary Examiner—John Kight, III
Assistant Examiner—John M. Cooney, Jr.
Attorney, Agent, or Firm—Oblon, Spivak, McClelland, Maier & Neustadt

[57] ABSTRACT

A flame-retardant spray-foamable phenolic urethane composition comprising a polyisocyanate component, a polyol component, an urethane-forming catalyst, a blowing agent and a foam stabilizer, wherein the polyol component comprises:

(1) a modified benzylic ether phenol resin obtained by adding from 20 to 100 parts by weight of a polyhydric alcohol or its alkyleneoxide adduct to 100 parts by weight of a benzylic ether phenolic resin, followed by heating under reduced pressure, and
(2) other polyol, in such amounts as to satisfy the following equation:

$$(x+y)/z = 0.2 - 1.5$$

wherein x is the amount by weight of the polyhydric alcohol or its alkyleneoxide adduct, y is the amount by weight of said other polyol, and z is the amount by weight of the benzylic ether phenol resin.

3 Claims, No Drawings

URETHANE COMPOSITION

The present invention relates to a flame-retardant in-situ spray-foamable phenolic urethane composition having excellent flame-resistance.

Heretofore, a hard polyurethane foam has been obtained by in-situ spray-foaming. However, the polyurethane foam obtained by such a conventional method has a limit in the flame-retardancy and flame-resistance and catches a fire. It has been attempted to use a phenol formaldehyde resin as the polyol component to solve such a drawback. For example, U.S. Pat. No. 3,598,771 and Japanese Examined Patent Publication No. 27093/1980 disclose that a polyurethane foam wherein a benzylic ether phenol resin is used as the polyol component (hereinafter referred to as a phenolic urethane foam) is excellent in the heat resistance and in the flame-resistance.

However, according to the study of the present inventors, this foam has substantial surface friability and thus has poor bonding strength with an object. Therefore, it is not useful for in-situ spray-foaming.

It has been attempted to overcome the surface friability of the phenolic urethane foam. For example, Japanese Unexamined Patent Publication No. 187312/1982 discloses that by a combined use of an aromatic isocyanate and an aliphatic isocyanate as the polyisocyanate component, the surface friability of the foam can substantially be reduced. However, the improvement has not yet been adequate. Further, since the aliphatic isocyanate is expensive as compared with the aromatic isocyanate, there remains an economical problem. Furthermore, since an aliphatic isocyanate is used, the resulting foam is slightly inferior in the flame-retardancy. Japanese Unexamined Patent Publication No. 136432/1983 discloses that the surface friability of such foam can remarkably be reduced by converting a part of phenolic hydroxyl groups of a phenol formaldehyde resin with an ethylene carbonate to alcoholic hydroxyl groups. However, this method includes a step of a reaction with a carbonate compound, whereby the production cost tends to be high.

It is an object of the present invention to provide an in-situ spray-foamable phenolic urethane foam having the above-mentioned drawbacks of the conventional techniques eliminated i.e. having excellent flame-retardancy and flame-resistance and being free from the surface friability of the foam.

The present invention has been made to accomplish the above object and provides a flame-retardant spray-foamable phenolic urethane composition comprising a polyisocyanate component, a polyol component, an urethane-forming catalyst, a blowing agent and a foam stabilizer, wherein the polyol component comprises:

(1) a modified benzylic ether phenol resin obtained by adding from 20 to 100 parts by weight of a polyhydric alcohol or its alkyleneoxide adduct to 100 parts by weight of a benzylic ether phenolic resin, followed by heating under reduced pressure, and (2) other polyol, in such amounts as to satisfy the following equation:

$$(x+y)/z = 0.2 - 1.5$$

wherein x is the amount by weight of the polyhydric alcohol or its alkylene oxide adduct, y is the amount by weight of said other polyol, and z is the amount by weight of the benzylic ether phenol resin.

Namely, the present invention is based on a discovery that it is possible to obtain an in-situ spray-foamable phenolic urethane foam having flame-retardancy and flame-resistance and being free from the surface friability of the foam, by using a benzylic ether phenol resin modified with a certain specific amount of a polyhydric alcohol or its alkyleneoxide adduct (hereinafter referred to simply as a modifying polyol) and other polyol in combination, as the polyol component in a flame-retardant spray-foamable phenolic urethane composition comprising a polyisocyanate component, a polyol component, a urethane-forming catalyst, a blowing agent and a foam stabilizer.

Now, the present invention will be described in detail with reference to the preferred embodiments.

The benzylic ether phenol resin to be used in the present invention may be prepared in accordance with the process disclosed in Japanese Examined Patent Publication No. 50873/1972. As the starting material phenol, phenol or an alkyl-substituted phenol can be used. It is particularly preferred to use phenol and an alkyl-substituted phenol in combination, since the compatibility with a blowing agent will be improved, which in turn will contribute to the reduction of the surface friability of the foam.

Thus, the quantitative relation of the three components of the benzylic ether phenol resin, the modified polyol and said other polyol in the polyol component, is represented by the following equation:

$$(x+y)/z = 0.2 - 1.5$$

In the above formula, x is the parts by weight of the modified polyol, y is the parts by weight of said other polyol, and z is the parts by weight of the benzylic ether phenol resin.

In the above equation, if the calculated value is less than 0.2, surface friability of the foam will result, and the object of the present invention can not be accomplished. If the value exceeds 1.5, the flame-retardancy and flame-resistance which are characteristic to the phenolic urethane foam, tend to deteriorate.

In the present invention, this equation is satisfied. However, as a specific useful range, the modified polyol is used in an amount of from 20 to 100 parts by weight relative to 100 parts by weight of the benzylic ether phenol resin, and said other polyol is used in an amount of from 0 to 100 parts by weight relative to 100 parts by weight of the obtained modified phenol resin.

The modified phenol resin in the present invention is obtained by adding from 20 to 100 parts by weight, preferably from 30 to 90 parts by weight, of a modifying polyol i.e. a hydric alcohol or its alkyleneoxide adduct, to 100 parts by weight of a benzylic ether phenol resin, followed by heating and reacting under reduced pressure. Preferably, the reduced pressure is from 1 to 200 mmHg, and the heating temperature is from 100° to 140° C. If the reduced pressure is higher 200 mmHg, the heating time tends to be long, which is not economical. On the other hand, if the heating temperature is less than 100° C., such is not economical, and if the heating temperature is higher than 140° C., the resulting modified phenol resin tends to have a high viscosity.

When the amount of the polyhydric alcohol or its alkyleneoxide (i.e. the modifying polyol) is less than 20 parts by weight, the surface friability of the foam tends to result, and the object of the present invention can not be accomplished, or the resulting modified phenol resin tends to have a high viscosity. If the amount is higher than 100 parts by weight, the flame-retardancy and flame-resistance which are characteristic to the phenolic urethane foam tend to deteriorate.

As said other polyol to be used in the present invention, any polyols commonly used for the production of urethane foams, may be employed. For example, it may be a diol such as ethylene glycol, diethylene glycol or 1,4-butanediol, a triol such as trimethylol propane or glycerol, a polyhydric alcohol such as sucrose, sorbitol and pentaerythritol, or a polyalkylene polyol obtained by adding at least one member selected from the group consisting of ethylene oxide, propylene oxide and butylene oxide to ethylene glycol, propylene glycol, glycerol, sucrose, ethylenediamine or tolylenediamine, as an intiaitor.

The polyisocyanate to be used in the present invention may be the one commonly employed for the production of urethane foams. The equivalent ratio of the polyol component and the polyisocyanate component is a ratio of NCO equivalent/OH equivalent=0.85–1.5, preferably 0.9–1.2. The composition of the present invention preferably comprises 100 parts by weight of the polyol component, from 0.01 to 5.0 parts by weight of the catalyst, from 10 to 100 parts by weight of the blowing agent and from 0.1 to 5.0 parts by weight of the foam stabilizer, wherein the polyol component and the polyisocyanate are in the above-mentioned equivalent ratio.

At the time of preparing the phenolic urethane foam of the present invention, a flame-retardant, a pigment, etc. which are commonly used for the preparation of urethane foams, may be incorporated.

The catalyst to be used in the present invention may be the one well known as a catalyst for converting isocyanate to urethane. For example, a tertiary amine such as triethylamine, triethylenediamine or pentamethyldiethylene triamine and/or dibutyltin dilaurate or dibutyltin diacetate, may be used alone or in combination.

The blowing agent to be used in the present invention may be the one commonly used for the preparation of urethane forms. For example, trichloromonofluoromethane, dichlorodifluoromethane or methylene chloride can be used.

As the foam stabilizer for the present invention, those commonly used for the preparation of urethane forms, may be used as they are. For example, a polydimethylsiloxane polyalkyleneoxide block polymer, a vinylsilane or a polyoxyalkylenepolyol compound may be mentioned.

Now, the present invention will be described in detail with reference to Examples. However, it should be understood that the present invention is by no means restricted by such specific Examples.

The density was measured in accordance with JIS A-9514, and the flame-resistance was measured in accordance with ASTM D-1692. Further, flame-retardancy was measured by the surface test in accordance with JIS A-1321 and evaluated by a method in which a test sample of a chimney shape having a size of 200×200×1820 mm (three side surfaces are foam and the front surface is a glass sheet) was prepared, and the combustion was observed by contacting a flame for 60 seconds by using a fish tale type burner (width: 46.7 mm) as the fire source.

PREPARATION OF A BENZYLIC ETHER PHENOL RESIN 3,570 kg of phenol, 1,740.kg of paraformaldehyde, 1.5 kg of lead naphthenate and 3 kg of zinc naphthenate were stirred and mixed, and they were reacted at a temperature of 110° to 114° C. for 3 hours and then rapidly dehydrated under reduced pressure to obtain a benzylic ether phenol resin (hereinafter referred to simply as resin A) having a viscosity of 30,000 cps (at 25° C.). The OH value: 520.

PREPARATION OF A MODIFIED PHENOL RESIN 100 kg of resin A and 20 kg of polyethylene glycol (average molecular weight: 200) were stirred and mixed, and they were reacted under reduced pressure of 20 mmHg at a temperature of 120° C. for 4 hours to obtain 108 kg of a modified phenol resin (hereinafter referred to simply as polyol A). The viscosity: 25,000 cps (at 25° C.), and the OH value: 450.

EXAMPLE 1

40 kg of polyol A, 10 kg of GR-08 (ethylenediamine type polyol, manufactured by Takeda Chemical Industries, Ltd.), 0.75 kg of SH-193 (foam stabilizer, manufactured by Toray Silicone K.K.), 23 kg of trichlorofluoromethane (manufactured by Mitsui Fluorochemical K.K.) and 1 kg of dimethyl hexamethylene diamine (Kaorizer No. 1, manufactured by Kao Corporation) were mixed, and the mixture was designated as part A solution.

4,4'-Diphenylmethane diisocyanate (Millionate MR, polyisocyanate manufactured by Nippon Polyurethane K.K.) was designated as part B solution. By using a spray-foaming tester FF-III (manufactured by Gasmer Co.), spray-foaming was conducted at a solution ratio of part A/part B=100/100. The foam thus obtained was excellent foam having a density of 30.8 kg/m$^3$ without surface friability. Polyol A used in this Example contained 20 parts by weight of the modified polyol relative to 100 parts by weight the benzylic ether phenol resin and satisfied [(modified polyol)+other polyol)]/[benzylic ether phenol resin]=0.50.

Now, the Comparative Example 1 will be given in which the modifying polyhydric alcohol was used in an amount of less than 20 parts by weight.

COMPARATIVE EXAMPLE 1

100 kg of resin A and 10 kg of polyethylene glycol (average molecular weight: 200) were stirred and mixed, and they were reacted under reduced pressure of 20 mmHg at a temperature of 120° C. for 4 hours to obtain 100 kg of a modified phenol resin (hereinafter referred to simply as polyol B). The OH value: 455.

40 kg of polyol B, 0.7 kg of SH-193, 18.4 kg of trichlorofluoromethane and 0.8 kg of Kaorizer No. 1 were mixed, and the mixture was designated as part C solution. Spray-foaming was conducted by using part C solution and part B solution. The obtained foam had substantial surface friability.

Now, the flame-resistance and flame-retardancy will be described with reference to Examples.

EXAMPLE 2

By using 100 kg of resin A and 45 kg of polyethylene glycol (average molecular weight: 200), 130 kg of a modified phenol resin (hereinafter referred to simply as polyol C) was obtained. The OH value: 460.

30 kg of polyol C, 10 kg of GR-08, 10 kg of 500 PN (alkyleneoxide added diol, manufactured by Asahi Glass Co., Ltd.), 0.75 kg of SH-193, 23 kg of trichlorofluoromethane and 1 kg of Kaorizer No.1 were mixed, and the mixture was designated as part D solution. By using part D solution and part B solution, spray-foaming was conducted. The foam thus obtained had a density of 31.5 kg/m$^2$ without surface friability. The results of the flame-resistance and flame-retardancy are shown in Table 1. [Modified polyol) +(other polyol)]/[benzylic ether phenol resin]=1.43

Then, the flame-resistance and the flame-retardancy were measured with respect to a case where the modifying polyol and other polyol are used in larger amounts and a case wherein a urethane foam raw material solution presently used for spray-foaming, was used. The results are shown in Table 1.

COMPARATIVE EXAMPLE 2

28 kg of polyol C, 11 kg of GR-08, 11 kg of 500PN, 0.75 kg of SH-193, 23 kg of trichlorofluoromethane and 1 kg of Kaorizer No. 1 were mixed, and the mixture was designated as part E solution. By using part E solution and part B solution, spray-foaming was conducted. [Modified polyol)+(other polyol)]/[benzylic ether phenol resin]=1.60.

COMPARATIVE EXAMPLE 3

By using a raw material solution manufactured by S Company and part B solution, spray-foaming was conducted. No surface friability was observed.

grade level, and thus they are believed to contribute substantially to the safety in the in-situ spray-foaming operation.

We claim:

1. A flame-retardant spray-foamable phenolic urethane composition comprising a polyisocyanate component, a polyol component, an urethane-forming catalyst, a blowing agent and a foam stabilizer, wherein the polyol component comprises:
   (1) a modified benzylic ether phenol resin obtained by adding from 20 to 100 parts by weight of a polyhydric alcohol or its alkyleneoxide adduct to 100 parts by weight of a benzylic ether phenolic resin, followed by heating under reduced pressure, and
   (2) a polyalkylene polyol obtained by adding at least one member selected from the group consisting of ethylene oxide, propylene oxide, and butylene oxide to ethylenediamine or tolylenediamine, in such amounts as to satisfy the following equation:

$$(x+y)/z = 0.2 - 1.5$$

where x is the amount by weight of the polyhydric alcohol or its alkyleneoxide adduct, y is the amount by weight of said polyalkylene polyol, and z is the amount by weight of the benzylic ether phenol resin.

2. The composition according to claim 1, wherein the polyhydric alcohol or its alkyleneoxide adduct is added in an amount of from 30 to 90 parts by weight relative to 100 parts by weight of the benzylic ether phenol resin to form the modified benzylic ether phenol resin.

3. The composition according to claim 1, which comprises 100 parts by weight of the polyol component,

TABLE 1

| | | JIS-A-1321 Surface Test[2] | | | | ASTM-D-1692 | | |
| --- | --- | --- | --- | --- | --- | --- | --- | --- |
| | Polyols/BEP[1] | CA | T·dθ | Residual flame (sec) | Crack deformation | Evaluation | Combustion distance (mm) | Class | Chimney type test |
| Example 1 | 0.50 | 55 | 70 | 15 | None | 2nd grade level | 21 | Self extinguishing | 30 seconds later, maximum flame: 300 mm 35 seconds, flame decreased. |
| Example 2 | 1.43 | 68 | 220 | 27 | None | 3rd grade level | 26 | Self extinguishing | 30 seconds later, maximum flame: 600 mm 35 seconds, flame decreased. |
| Comparative Example 2 | 1.60 | 72 | 245 | 28 | None | 3rd grade level | 65 | Readily flammable | 30 seconds later, maximum flame: 800 mm 35 seconds, flame decreased. |
| Comparative Example 3 | Product of S Company | 144 | —[4] | 0 | Passed through | 3rd grade level | 67 | Readily flammable | 50 seconds later, deflagration occurred. Flame was so high as at least 1820 mm. |

[1]Weight ratio of [(modifying polyol) + (other polyol)]/(benzylic ether phenol resin)
[2]Flame retardancy 2nd Grade Level Test (3) Flame retardancy 3rd Grade Level Test
[4]Exceeds the standard temperature curve within 3 minutes.

As described in the foregoing, the urethane foam presently used for spray-foaming, is of self-extinguishing type. However, it causes deflagration in the chimney type test and brought about a combustion phenomenon which appears to be the main cause of fires of recent years. Whereas, the foams according to the present invention hardly bring about such a deflagration phenomenon and shows in the JIS A-1321 test a second from 0.01 to 5.0 parts by weight of the catalyst, from 10 to 100 parts by weight of the blowing agent and from 0.1 to 5.0 parts by weight of the foam stabilizer, wherein the polyol component and the polyisocyanate component are in such amounts as to satisfy a ratio of NCO equivalent/OH equivalent=0.85-1.5.

* * * * *